United States Patent [19]

Bickel

[11] 4,314,364
[45] Feb. 2, 1982

[54] LONG SWEEP VIBROSEIS RECORD PRODUCTION

[75] Inventor: Samuel H. Bickel, Garland, Tex.

[73] Assignee: Atlantic Richfield Company, Los Angeles, Calif.

[21] Appl. No.: 60,949

[22] Filed: Jul. 26, 1979

[51] Int. Cl.³ ............................................. G01V 1/28
[52] U.S. Cl. ...................................... 367/43; 367/48; 367/49; 364/421
[58] Field of Search .................... 367/43, 48, 49, 74, 367/189; 364/421, 724–726, 574

[56] References Cited

U.S. PATENT DOCUMENTS

| | | | |
|---|---|---|---|
| 3,209,250 | 9/1965 | Burns et al. | 367/49 |
| 3,541,458 | 11/1970 | Rlurd | 367/48 |
| 3,662,108 | 5/1979 | Flanagan | 367/49 |
| 3,796,989 | 3/1974 | Rauos et al. | 367/41 |
| 4,110,728 | 8/1978 | Fuller et al. | 367/49 |
| 4,173,759 | 11/1979 | Bakhru | 364/574 |

FOREIGN PATENT DOCUMENTS 2448007 4/1976 Fed. Rep. of Germany ........ 367/41

OTHER PUBLICATIONS

Handley, "Vibrolokator, Method of Interpreting Seismograms...Sources", 7/78, pp. 1–139 MS thesis, Colorado School of Mines.

Crawford et al., "Continuous Signal Seismograph", 2/60, pp. 95–105, Geophysics, vol. 25, #1.

Primary Examiner—Nelson Moskowitz
Attorney, Agent, or Firm—Richards, Harris & Medlock

[57] ABSTRACT

This invention relates to continuous wave seismic exploration and more particularly to generating long sweep continuous seismic waves and utilizing signals resulting from detection of said seismic waves to significantly enhance the signal-to-noise ratio while simplifying the required processing.

13 Claims, 3 Drawing Figures

LONG SWEEP VIBROSEIS RECORD PRODUCTION

BACKGROUND

Seismic exploration is widely practiced in delineating subsurface layering and location of subsurface structures that may be associated with accumulations of hydrocarbons and other minerals. Initial efforts in seismic exploration involved use of refraction seismographs. Later, reflection procedures were perfected.

More recently continuous wave seismology has been developed wherein a unique non-repeating signal of a few seconds duration is generated by a vibrator at a sending station. A composite signal is detected at a receiving station spaced from the sending station. The composite represents on a time scale the sum of all of the waves traveling from the source directly through near-surface layers, refraction paths and reflection paths from subsurface interfaces.

In continuous wave seismology it is known that increases in time length of the input signal, i.e., the sweep interval, will provide greater volumes of useful signal information. In operation, the signals are recorded in mobile seismic exploration units which generally have somewhat limited data handling capacities. Even though it is known that extending the sweep interval will provide data by which more precise results can be obtained, the volume of signal data that could be made available cannot be readily handled in accordance with conventional present day field techniques.

The present invention is directed towards seismic field operations wherein the sweep interval is increased and the resultant detected signal information is then processed in a unique way to take advantage of the increase in available signal and which may be accomodated in field units to provide greater resolution of the subsurface. By the present invention the signal-to-noise ratio is dramatically increased. At the same time, the complexity of the processing system is substantially reduced. A significant benefit of use of the present invention is elimination of harmonic distortion and enhancement of resolution.

Because of the chirp transform nature of linear frequency modulated sweeps, resulting seismic data can be compressed in real time by a simple multiplication followed by a sequence of low-pass filter-decimation stages. Arbitrarily long sweep times can be accomodated with a modest amount of field hardware. Processing gains in excess of 50 db have been realized.

DISCLOSURE OF THE INVENTION

In accordance with the present invention, continuous wave long sweep seismic energy is transmitted through the earth from a sending station. A reference signal is generated representative of time variations in the transmitted energy. The reference signal varies monotonically in frequency over a predetermined band B during a sweep period of time T extending preferably for minutes.

A composite signal is generated representative of summation of arrivals of the energy at a receiving station.

The reference signal and the composite signal are combined to produce a real part product signal. The real part product signal is filtered to eliminate frequency components above the limit $B/T \times t$, where $t$ is travel time, for a reflection from the deepest reflector of interest. Output signals are generated representative of Fourier transform of the filtered real part product signal and the Fourier transform of the same product signal shifted by 90°. The output signals are phase corrected and combined to produce a time domain summation representative of subsurface structures from which seismic waves reflect back to the surface.

BRIEF DESCRIPTION OF DRAWINGS

For a more complete understanding of the present invention and for further objects and advantages thereof, reference may now be had to the following description taken in conjunction with the accompanying drawings in which.

DETAILED DESCRIPTION

FIG. 1

Figure 1:
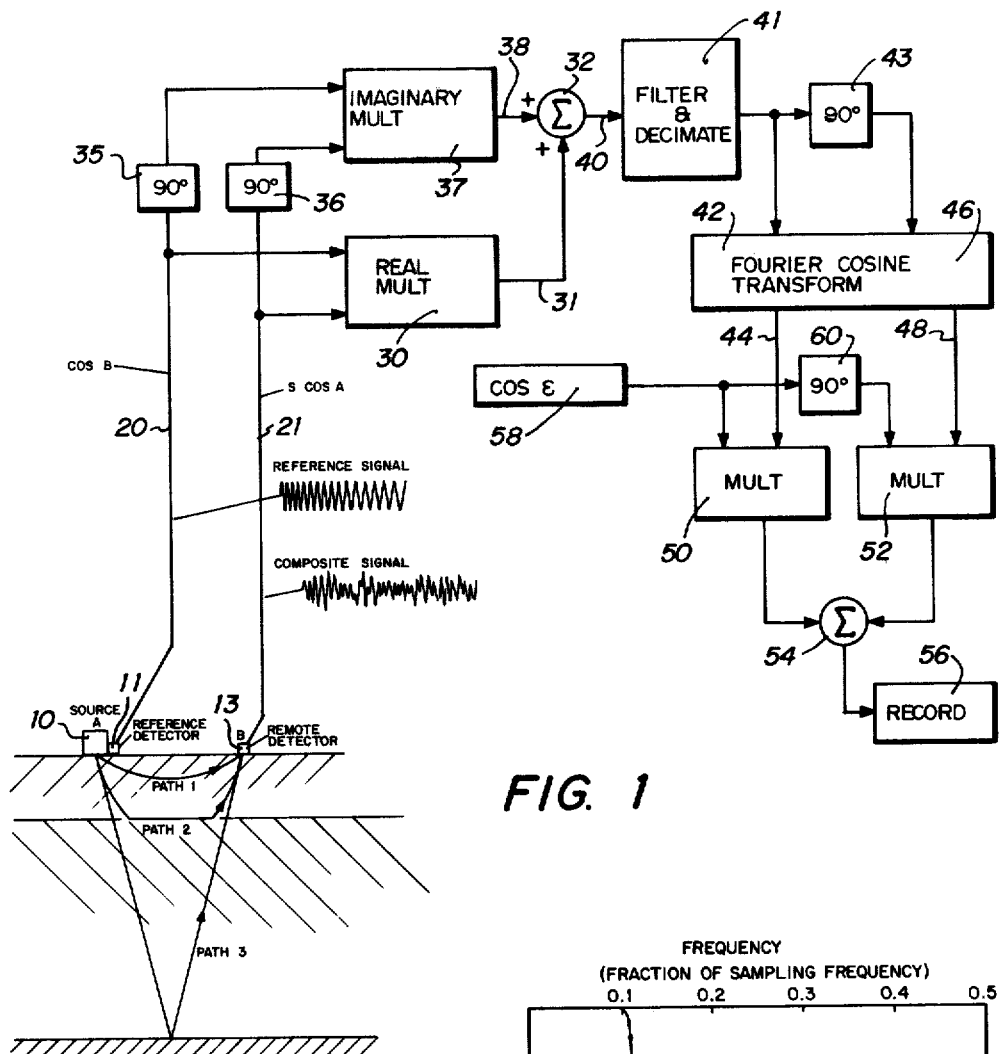
FIG. 1 is a diagram illustrating a system embodying the present invention.
Figure 2:
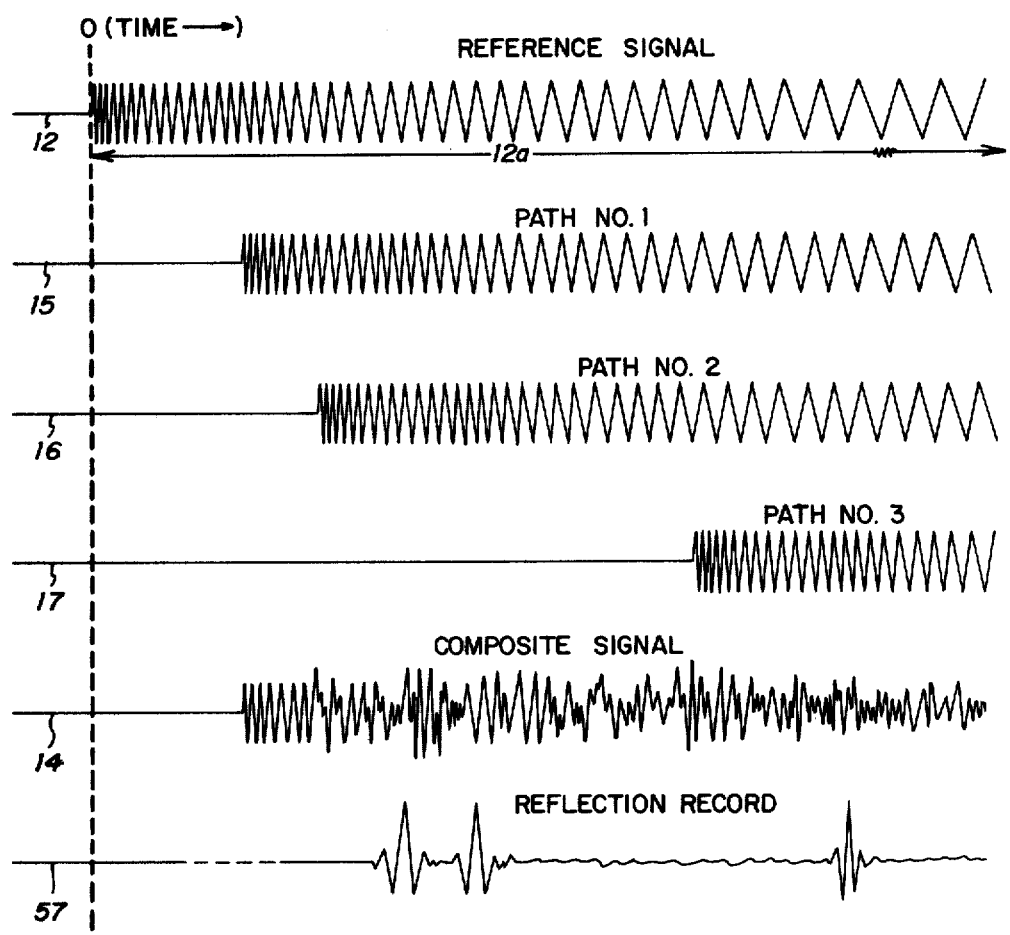
FIG. 2 is a time based diagram illustrating wave forms involved in the operation of the system of FIG. 1.

Referring to FIG. 1, a continuous signal seismograph system has been shown wherein a source 10 at the surface of the earth is caused to produce a train of acoustic waves in the earth. In accordance with the well known continuous signal seismology, the acoustic energy imparted into the earth preferably will be constant amplitude, monotonically varying in frequency over a predetermined sweep interval T. A reference detector 11 adjacent to source 10 produces an output signal which will be referred to hereinafter as a reference signal. Such a reference signal 12 is illustrated in FIG. 2 wherein during sweep interval 12a the input frequency varies from a high frequency to a low frequency, for example, from 100 hertz to 5 hertz. The variation in frequency is a predetermined function of time maintained under the control of a suitable control system in source 10, as is well known. Detector 11 is shown symbolically in FIG. 1, it being understood that it represents the generation of a signal swept in frequency in accordance with the acoustic energy imparted to the earth by source 10. In practice the reference signal normally is generated electrically from the drive applied to source 10, rather than by means of an acoustic detector coupled to the earth in the vicinity of source 10.

As illustrated in FIG. 1, energy from source 10 may follow many paths. Three such paths are shown in FIG. 1. Path 1 represents direct or surface wave paths. Path 2 represents a shallow refraction path. Path 3 represents a deep reflection path. A detector or seismometer 13 is positioned at the earth's surface remote from source 10 and serves to generate a composite output signal representing background noise summed with signals from source 10 refracted and reflected at detector 13 as a time variable function.

FIG. 2

In FIG. 2 there are illustrated representative wave forms involved in the present invention. Wave form 12, spanning a time interval 12a, represents the seismic wave generated in the earth by source 10 of FIG. 1. Wave form 15 represents the same wave detected at detector 13 after travel along path 1. Wave form 16 is detected at detector 13 after travel through the refraction path 2. Wave form 17 represents the same input signal as detected at detector 13 after travel over path 3. The wave form 14 is a representation of the composite signal appearing on output channel 21 from detector 13 and represents a summation of wave forms 15, 16 and 17. Wave forms 15, 16 and 17 are idealized representations of the waves traveling paths 1, 2 and 3.

Thus, a signal having a wave form corresponding to the reference signal appears on the output channel 20 leading from detector 11. The signal corresponding to the composite wave form 14 appears on output channel 21 leading from detector 13.

In accordance with the present invention steps significantly different in scope and result are followed for the production of a seismogram of increased signal-to-noise ratio and elimination of harmonic distortion through the use of a substantially simplified processing system which utilizes the increased signal information involved in the long time sweep of the input seismic energy.

The scan or sweep interval 12a of FIG. 2 is made to be much longer than normally is employed in continuous signal seismograph work. Conventionally, scan intervals of the order of 6 seconds have heretofore been employed. The present invention involves periods of a minute or several minutes, thereby providing much more information content in the composite signal 14. In order to be able to utilize the information thus made available, the signal handling portions of the system of FIG. 1 differ substantively from prior art systems.

A complex multiplier is used to produce a signal in which difference frequencies are present and sum frequencies are eliminated. More particularly, the complex multiplier unit receives signals from channels 20 and 21. The signals are applied to a first multiplier 30 to produce a product signal on output channel 31. The product signal on channel 31 is then applied to a summation unit 32. The signals on channels 20 and 21 are applied by way of 90° phase shift units 35 and 36 to the input terminals on a second multiplying unit 37 for the production on output channel 38 of a signal representative of the product of the two phase shifted input signals.

The signal on channel 38 is also applied to summation unit 32 such that the signal on channel 38 is effectively subtracted from the signal on channel 31, leaving on output channel 40 a unique signal which is appropriately described as a real part product signal, the terms "real part" and "imaginary part" having meanings well known in polar notation.

Units 30, 37 and 32 comprise the complex multiplier above referred to in which sum and difference frequencies in the product are treated to eliminate the sum and leave only the difference frequencies on channel 40. In producing the product signals, unwanted phase distortion is present, but is corrected downstream as will be described.

The output of summation unit 32 is connected by way of channel 40 and a filter-decimation unit 41 to a Fourier transform unit 42. A 90° phase shift unit 43 is illustrated as to be representative of the fact that Fourier transform unit 42 provides both real and imaginary outputs. The real and imaginary outputs appear on channels 44 and 48, respectively, and are applied as input signals to multipliers 50 and 52, respectively. The outputs of multipliers 50 and 52 are applied to a summation unit 54, the output of which is applied to a recorder 66.

Second inputs to each of multipliers 50 and 52 are supplied from a third input signal source 58. The third input signal cosine $\epsilon$ is applied directly to the second input of multiplier 50 and by way of 90° phase shifter 60 to the second input of multiplier 52. Use of the third input signal cosine $\epsilon$ corrects for the unwanted phase distortion introduced by multipliers 30 and 37.

From the foregoing it will be understood that there are three input signal sources in the system:

(1) Source 11 which generates the reference signal cos B on channel 20.

(2) Source 13 which generates the composite reflection signal S cos A on channel 21. In the general case, this signal is a summation of waveforms $$\sum_{i=1}^{N} S_i \cos A_i$$

where:
N is the total number of reflectors;
S is reflection amplitude; and
A is instantaneous phase.

(3) Source 58 which is a generator of the signal cos $\epsilon$ where $\epsilon = \omega_L t - \alpha t^2$
$\omega_L$ = lowest frequency in the sweep
$2\alpha = B/T$ = sweep rate
B = signal bandwidth
T = sweep duration
t = record time.

In operation of FIG. 1, the first step, is to combine the input signal S cos A and the reference signal cos B by use of complex multiplier 30, 37, 32 to produce a real part product signal. The frequency of this signal depends linearly with reflection time t. Shallow reflectors are expressed in low frequencies and more distant reflectors are expressed in higher frequencies, but in both cases the signal has an unwanted variable phase distortion angle $\epsilon$ which is to be corrected.

Figure 3:
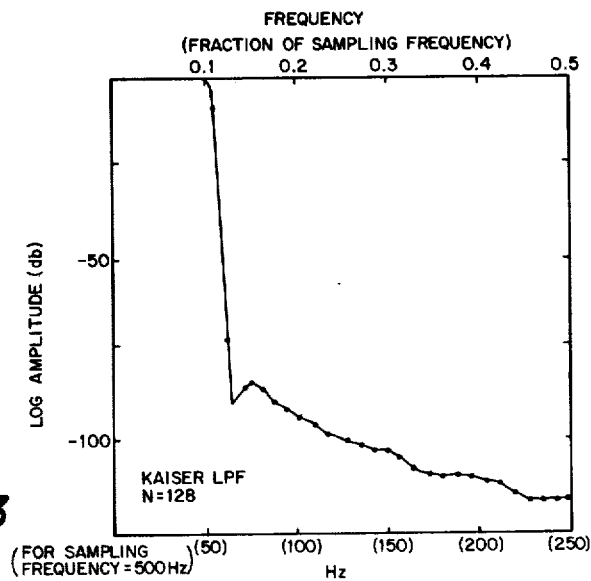
FIG. 3 is a plot of a filter characteristic employed in the system of FIG. 1.

Unit 41 is a real time data compression filter. Compression is used because the sweep duration T is very much greater than the most distant reflection time, $t_r$, in the record and interest is in only those frequencies, $\omega_r$, of the filtered product $\overline{C}(t)$ in the vicinity of zero. A low-pass filter is used to produce C(t) which has a cutoff characteristic so sharp that the data rate can be reduced by an operation known as data decimation. A suitable filter may be as detailed in Rabiner and Gold, *Theory and Application of Digital Signal Processing*, page 93, Bell Laboratories, Prentiss Hall, 1975. Data decimation involves not using all of the data samples available for some operations, but using all data samples in other operations. A suitable filter characteristic is shown in FIG. 3. It is a symmetrical filter 128 data points long. The filter is applied to 128 data points centered at a given data point to produce a first filtered output point. The filter is then applied to 128 data points centered D data points from the previous center. Thus, all data points are used in the filter operation, but the centers are not located at each sucessive data point, but rather the center is moved D points each time the filter is applied.

The extent of data decimation employed will vary directly with sweep duration. Data from the arbitrarily long sweeps employed herein are compressed with a fixed number of multiply and add operations, by repeated stages of low-pass filtering followed by decimation. N/2 multiply and add operations will implement a symmetric filter N points long, if an output point is required for every input data point. However, in the present case the data are decimated by a factor of D, and only N/2D operations are required. For the next stage only $N/2D^2$ operations are required and for the nth stage only $N/2D^n$ operations are required. Using the geometric series the number of operations for infinite number of stages is given by:

$$M = \frac{N}{2(D-1)} \quad D = 2,3,...$$

The decimation rate is two or more. Therefore, it will be understood that at most N/2 operations are required to implement an infinite number of filter stages.

The filter characteristic shown in FIG. 3 has a signal rejection of 80 db for frequencies beyond 0.12 of the sampling frequency. This permits decimation by a factor of D=4 with a filter 128 points long. Because of symmetry, only 64 multiply and add operations are required to implement the filter at the sampling frequency. The data can be decimated after each filtering step. As a consequence, an output is required on every fourth point, reducing the number of operations to sixteen. The decimated output may be subjected to another stage of filtering. Another sixteen operations at the reduced sample frequency requires only four additional operations at the input sampling frequency, bringing the total number of operations to twenty. Another filter-decimation stage adds only one more operation and infinite number of stages would only add two more operations.

Low-pass filtering and decimation as above-described may be performed in the field because of the low data rate effected by decimation. An approximate seismic record is produced by Fourier transform unit 42 which may be thought of in terms of a bank of band pass filters followed by integration. Because of the low frequencies involved, digital filters will be employed. In such form, the seismic record signal on channel 44 is multiplied by a factor of cos ε for phase correction.

Suitable Fourier transform implementation is well known and may be as detailed by Singleton, R. C., in "An Algorithm for Computing the Mixed Radix Fast Fourier Transform", IEEE Transactions on Audio and Electroacoustics, Vol. 17, No. 2 (June 1969), pp. 93–103. Such a Fourier transform unit operates in complex form to produce both a real output on channel 44 and an imaginary output on channel 48. The two outputs of transform unit 42 correspond to Fourier cosine and sine transforms. The output signals from unit 42 are then modulated by the signal cos ε and sine ε for phase correction.

Signals from units 50 and 52 are then combined in the summation unit 54 to produce the final seismic signal 57, FIG. 2 which is free of unwanted modulations. The signal 57 may then be applied to the recorder 56 to produce a seismic record in any one of the many known varieties of seismic formats.

The Fourier transform and phase compensation operations are thus simplified for field operations. They could well be performed other than in the field, in which case the signal at the output of filter unit 41 as appearing on channel could be stored as on magnetic tape for use at a data processing center.

Further, the data may be sampled and placed in digital form prior to the real part multiplier 30, 37, 32 so that all processing operations could be performed digitally in the field by a minicomputer or microprocessor.

The 90° phase shifts may be approximated by delaying the signal ¼ of the period of the center frequency of the sweep range. As a result of this approximation, unwanted frequencies would be present in the record. The unwanted frequencies, however, would be attenuated by a factor of Attenuation $= (\pi t/2T)^2$ Since very strong signals from close reflectors are measured simultaneously with weak signals from deeper reflectors, alising is avoided in the attenuated signals by using the digital low-pass filter following which the sample rate is reduced by data decimation. Real time filters which combine the operation of low-pass filtering with data decimation may supply a minimum of 80 db of attenuation in excess of the 30 to 50 db attentuation that accrues from the real part product multiplication in unit 30, 37, 32. This may be done with the small number of multiply and add operations above-noted whereby arbitrarily long sweeps are compressed in the field with very small amount of hardware.

An important purpose in the use of digital low-pass filters such as indicated in FIG. 3 is to provide integration gain against random noise. This is true even if no sum frequencies are present at the output of the real part product signal, i.e., when a perfect 90° phase shifter is used. A coherent gain against random noise is obtained using the long sweep, sharp filter cutoff combination. The amount of attenuation in the stop band is proportional to processing gain, which is in turn proportional to the sweep duration.

To recap the foregoing, in processing the three input functions above-described, the complex multiplier operates on the reference signal and the composite signal to produce a real part product output signal. The real part output is filtered to eliminate signal frequency components above the limit B/T×t, where:

t is the two-way travel time for a reflection from the deepest reflector of interest;

B is the bandwidth, i.e., the difference between the highest and lowest frequency in the reference signal; and T is the sweep interval 12a, FIG. 2.

After low-pass filtering of the real part product output signal and reducing the frequency bandwidth by a predetermined factor, the resultant narrow band signal is then subject to Fourier transformation and phase correction to produce the time domain representation of subsurface reflectors from which the continuous sweep seismic input energy was reflected back to the surface.

Having described the invention in connection with certain specific embodiments thereof, it is to be understood that further modifications may now suggest themselves to those skilled in the art and it is intended to cover such modification as fall within the scope of the appended claims.

I claim:

1. A method of generating a time domain seismic record representing subsurface interfaces on a real time basis in seismic prospecting where a continuous sweep wave input generator is utilized to impart an acoustic wave train in the earth at a seismic sending station, the combination which comprises:

(a) applying said train in the earth for a sweep interval T of the order of minutes while varying the frequency thereof monotonically over a predetermined band B;

(b) generating a reference signal representative of said train at said sending station;

(c) generating a composite signal representative of said train of waves appearing at a receiving station spaced from said sending station;

(d) producing a real part product signal from said reference signal and said composite signal;

(e) filtering out all frequency components of said product signal above the limit $B/T \times t$, where t is the travel time for a reflection from the deepest reflector of interest;

(f) decimating a predetermined fraction of said filtered signal to reduce the frequency bandwidth of said filtered signal; and (g) generating a seismic signal by the Fourier transformation of said reduced bandwidth signal for a time domain representation of subsurface interfaces which reflected said train.

2. A method of generating a seismic signal representing subsurface interfaces in a seismic prospecting system where a swept frequency seismic wave train is transmitted through the earth from a sending station, the method which comprises:

(a) generating a reference signal representative of time variations in said transmitted energy at said sending station which varies monotonically in frequency over a predetermined band B during a period of time T of several minutes;

(b) generating a composite signal representative of summation of appearances of said train at a receiving station after travel over available paths;

(c) combining said reference signal and said composite signal to produce a real part product signal;

(d) filtering said real part product signal to eliminate frequency components above the limit $B/T \times t$, where t is travel time for a reflection from the deepest reflector of interest;

(e) decimating the filtered signal by a predetermined factor; and (f) generating a seismic signal representative of a phase corrected Fourier transform of the reduced decimated signal for a time domain representation of subsurface interfaces from which said train was reflected back to the surface.

3. A method of generating a seismic signal representing subsurface interfaces in seismic exploration wherein a continuous sweep seismic wave train is transmitted through the earth, a composite signal is generated representative of appearance as a time function of said train at a sensing station and a reference signal representative of said transmitted train is generated, the method which comprises:

(a) sweeping the frequency of said train over a time interval much longer than the travel time to and from the deepest reflector of interest;

(b) multiplying said composite signal and said reference signal to produce a frequency difference real part product signal;

(c) integrating said product signal against noise components to produce a filtered-decimated signal;

(d) correcting the phase of said filtered-decimated signal; and (e) recording the corrected signal as a function of time as the seismic signal.

4. A method of generating a seismic signal representing subsurface interfaces in seismic exploration wherein a continuous sweep seismic wave train is transmitted through to the earth, a composite signal is generated representative of appearance as a time function of said train at a sensing station and a reference signal representative of said transmitted train is generated, the method which comprises:

(a) monotonically sweeping the frequency of said train over a time interval much longer than the travel time to and from the deepest reflector of interest;

(b) multiplying said composite signal and said reference signal to produce a first product signal;

(c) delaying both said signals by 90° and multiplying the delayed signals to produce a second product signal;

(d) subtracting said second product signal from said first product signal to produce a difference frequency real part product signal;

(e) low-pass filtering and decimating said real part product signal;

(f) producing a real and an imaginary Fourier transform of the decimated signal;

(g) correcting said Fourier transforms for phase distortion; and (h) summing the corrected transforms to produce a time variable seismic signal representative of subsurface layering.

5. A method of generating a seismic signal representing subsurface interfaces in seismic prospecting where a continuous sweep wave input generator is utilized to impart an acoustic wave train in the earth at a seismic sending station, the combination which comprises:

(a) applying said train for a sweep interval T of the order of minutes while varying the frequency thereof monotonically over a predetermined band B;

(b) generating a reference signal representative of said train at said sending station;

(c) generating a composite signal representative of said train of waves appearing at a receiving station spaced from said sending station;

(d) producing a real part product output signal from said reference signal and said composite signal;

(e) filtering out all frequency components of said product signal above the limit $B/T \times t$, where t is the travel time for a reflection from the deepest reflector of interest;

(f) reducing the frequency bandwidth of said fitered signal by selecting a predetermined fraction of uniformly time spaced samples from said filtered signal; and (g) generating the seismic signal representative of the Fourier transform of said reduced bandwidth signal as a time domain representation of subsurface interfaces which reflected said train.

6. The method of claim 5 wherein said sweep is linear in frequency change as a function of time over a band of from about 100 Hz to about 5 Hz.

7. A method of generating a seismic signal representing subsurface interfaces in seismic exploration wherein a continous sweep seismic wave train is transmitted through the earth, a composite signal is generated representative of appearance as a time function of said train at a sensing station and a reference signal representative of said transmitted train is generated, the method which comprises:

(a) linearly sweeping the frequency of said train during a time interval of several minutes;

(b) producing uniformly spaced time samples from said signals to establish digital representations of both said composite signal and of said reference signal;

(c) multiplying said digital representations of said composite signal and said reference signal to produce a frequency difference real part product signal;

(d) integrating said product signal against noise components by filtering and decimating said product signal through utilization at the original sample density corresponding samples from said product signal, but at lower density decimation filter points;

(e) correcting the phase of the filtered-decimated signal; and (f) recording the corrected signal as a function of time as the seismic signal.

8. The method of claim 7 wherein said time samples are taken at about 500 Hz and the density of said decimation filter points is lower by a factor of four.

9. In seismic prospecting where a continuous sweep wave input generator is utilized to impart an acoustic wave train in the earth at a seismic sending station, the combination which comprises:

(a) means for applying said train in the earth for a sweep interval T of the order of minutes while varying the frequency thereof monotonically over a predetermined band B;

(b) a first signal source at said sending station to generate a reference signal representative of said train;

(c) a second signal source for generating a composite signal representative of said train of waves appearing at a receiving station spaced from said sending station;

(d) a complex multiplier connected to receive said reference signal and said composite signal to produce a real part produce output signal;

(e) means for filtering out all frequency components of said product signal above the limit $B/T \times t$, where t is the travel time for a reflection from the deepest reflector of interest;

(f) means for selecting a predetermined fraction of said filtered signal to reduce the frequency bandwidth of said filtered signal; and (g) means responsive to said signal of reduced bandwidth for generating an output signal representative of the Fourier transform of said reduced bandwidth signal, thereby to produce a time domain representation of subsurface interfaces which reflected said train.

10. The system according to claim 9 wherein means are provided for correcting the output of said last named means for phase distortion introduced by operation of said complex multiplier.

11. The system according to claim 10 wherein a third signal source is provided to generate a phase correcting signal to modify the phase relations in said Fourier transform.

12. The system according to claim 11 wherein said third signal source generates a signal representative of the function $\epsilon = \omega_L t - \alpha t^2$ where $\omega_L$ is the lowest frequency in the sweep $\alpha$ is half the sweep rate, t is record time.

13. In seismic prospecting where a continuous sweep wave input generator is utilized to impart an acoustic wave train in the earth at a seismic sending station, the combination which comprises:

(a) means for applying said train for a sweep interval T of the order of minutes while varying the frequency thereof monotonically over a predetermined band B;

(b) a first signal source at said sending station to generate a reference signal representative of said train;

(c) a second signal source for generating a composite signal representative of said train of waves appearing at a receiving station spaced from said sending station;

(d) a complex multiplier connected to receive said reference signal and said composite signal to produce a real part product output signal;

(e) means for filtering out all frequency components of said product signal above the limit $B/T \times t$, where t is the travel time for a reflection from the deepest reflector of interest;

(f) means for selecting a predetermined fraction of said filtered signal to reduce the frequency bandwidth of said filtered signal;

(g) means responsive to said signal of reduced bandwidth for generating an output signal representative of the Fourier transform of said reduced bandwidth signal, and (h) means including a third signal source and multiplier means for producing a phase corrected version of said Fourier transform involving from said third signal source a signal cos $\epsilon$ where $\epsilon = \omega_L t - \alpha t^2$, $\omega_L$ is the lowest frequency in said band B, t is record time and $\alpha = B/T$, thereby to produce a time domain representation of subsurface interfaces which reflected said train.

* * * * *